3,011,218
METHOD OF MANUFACTURING ARTICLES OF DIISOCYANATE FOAM HAVING PROTECTIVE SKIN COATINGS THEREON

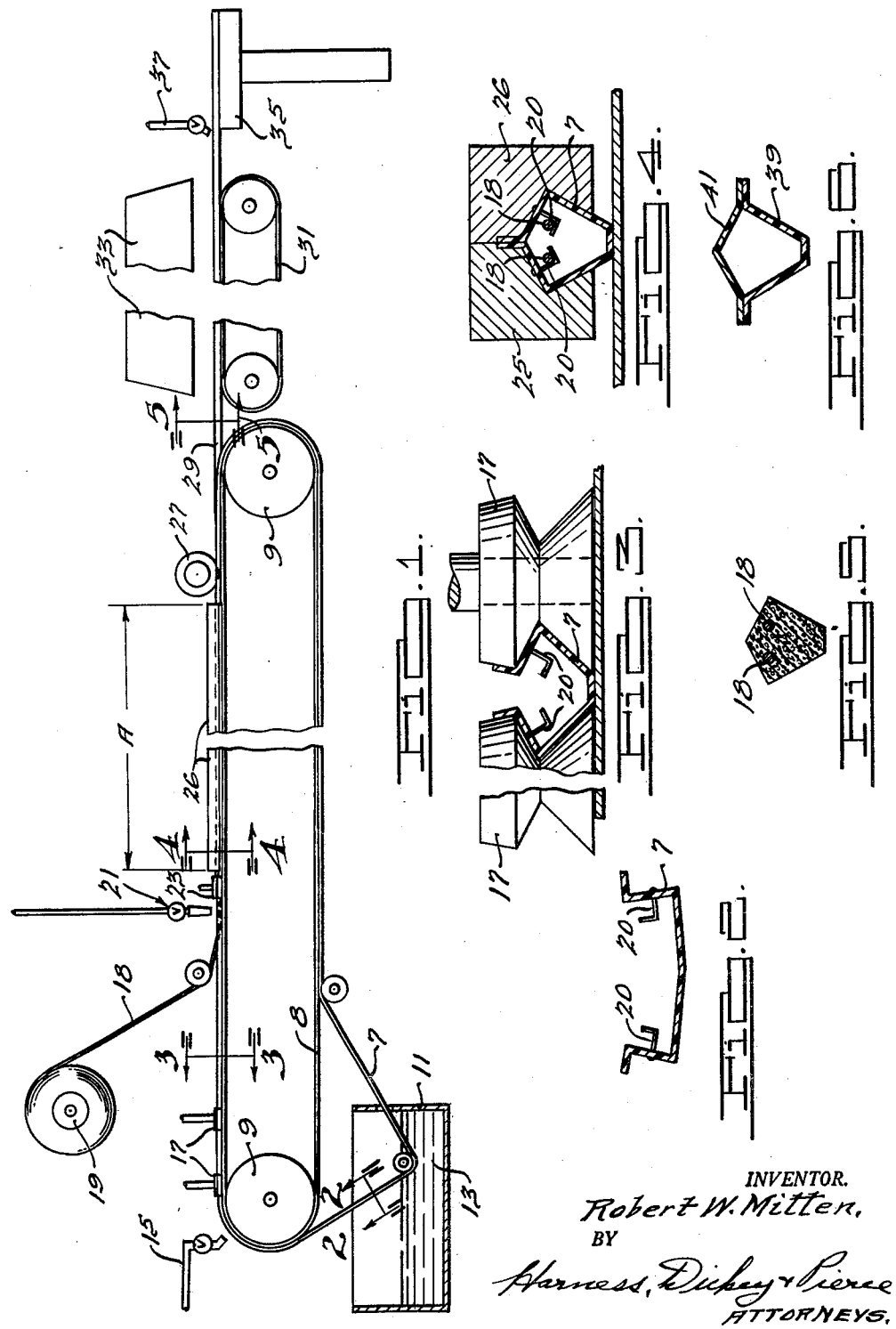

Robert W. Mitten, Keokuk, Iowa, assignor to Sheller Manufacturing Company, Detroit, Mich., a corporation of Illinois
Filed Sept. 28, 1956, Ser. No. 612,724
3 Claims. (Cl. 18—59)

This invention relates to resilient articles of diisocyanate foam having protective skin coatings formed thereon and to a method and means of manufacturing such articles. More particularly, the invention relates to a method of continuously producing diisocyanate flexible foam weatherstrip, cord and similar articles having integrally united thereto impervious protective skin coatings.

Diisocyanate foams can be made in rigid form or they can be made in flexible form and it is the latter type of diisocyanate foam to which this invention relates. Because of the thin wall of the structure of the cellular product, the same is subject to deterioration by moisture or humid conditions at extremes of temperature.

Accordingly, important objects of the present invention are to provide diisocyanate foam articles with strongly adherent protective skin coatings on the surface thereof; and to provide such articles with a cell structure in which the individual cells are either intercommunicating or non-communicating.

Still other objects of the invention are to provide a method and means for forming diisocyanate foam products of either open and closed type cell structure having uniformly distributed and firmly bonded over the surface thereof protective skin coatings; and to provide a continuous method of forming such articles which is particularly suited for production techniques.

Diisocyanate foam products, per se, are well-known to the art and are usually formed either in a two-step process where a prepolymer (which is itself the reaction product of a polyester resin and a diisocyanate) is reacted with water and a catalyst to form a cellular reaction product with the simultaneous liberation of carbon dioxide gas or in a one-step process from the direct reaction of a polyester resin, a diisocyanate, water and a catalyst. The reaction mass is allowed to polymerize while confined in a mold which determines the final form of the articles. The final cellular product contains a number of urethane linkages and is oftentimes referred to as polyurethane foam interchangeably with the term diisocyanate foam. For certain applications, cellular products having intercommunicating cells are most desirable while for other applications cellular products having non-communicating cells are preferred and provision for making both types at will is a feature of this invention.

The polyester resin which is used as a starting product for the diisocyanate foam is formed from the reaction between polyhydric alcohols and polybasic acids. The invention can be successfully applied to polyester resins made from such polyhydric alcohols as ethylene glycol, diethylene glycol, hexamethylene glycol, glycerol, trimethylolpropane and others; and with such polycarboxylic acids as phthalic, isophthalic, terephthalic succinic, adipic, sebacic, maleic, fumaric, malic or anhydrides thereof and others. Polyester resins are not the only materials that may be reacted with a diisocyanate to form the cellular reaction product used in the present invention as it is well known that any organic substance having a plurality of groups containing reactive hydrogen may be employed. One example of a suitable class of materials are the polyalkylene ether glycols.

The diisocyanates that may be employed in the practice of the invention are any organic compounds containing two reactive NCO groups such as toluene diisocyanate, naphthalene diisocyanate, hexamethylene diisocyanate and others.

Catalyst and/or emulsifiers may be employed such as N-methyl morpholine and diethylethanolamine.

The above brief description of the type of cellular reaction product to which this invention relates can be augmented by reference to the following patents which are some of the basic patents in the art and describe in more detail the chemistry of the formation of these products: United States Patents 2,266,777; 2,268,586; 2,277,-083; 2,282,827; 2,284,896; 2,333,639; 2,430,479; 2,511,-544; German Patent 901,471; and Italian Patent 367,704.

The term "cellular reaction product" as used herein is intended to include sponge-like flexible materials with a plurality of cells and which have a density of less than 30 pounds per cubic foot and which are formed by the reaction of a diisocyanate and an organic substance having a plurality of groups containing reactive hydrogen as described.

In accordance with the present invention, it has been found that flexible diisocyanate cellular reaction products can be formed with a cell structure of two types, viz., open or closed. The articles produced with open or interconnecting cells have a greater recovery power when subjected to intermittent pressures because they "breathe" so to speak, i.e., they allow the gas or air entrapped in the individual cells to escape through the interconnecting cell structure upon the application of pressure and when the pressure is released, the surrounding atmosphere readily enters the foam product through the maze of interconnecting cells. The difference in cell structure of diisocyanate foam products can be effected in the practice of the invention by controlling the amount of ingredients placed in the mold cavity and regulating the state of cure to which the reaction products are allowed to proceed when in the mold cavity. The production of interconnecting or open cell type foam is of primary interest when the product is to be used for automotive weatherstripping or for sealing of refrigerator doors and allied applications. Production of diisocyanate foam products with closed cells in which the individual cells do not communicate with each other is useful for different applications and is similarly brought about in accordance with the present invention by controlling the amount of material placed in the mold cavity and the degree of cure to which the reaction mass is allowed to proceed while being confined within the mold cavity.

For the production of diisocyanate foam products having interconnecting or open cells, the mold cavity is only partially filled at the commencement of the process. Just enough reaction mass is added which will subsequently expand and fill the mold cavity. The material is allowed to remain in the mold cavity until it has nearly completely set-up or cured or at least enough set-up is allowed to take place so that when the material is removed from the mold, further expansion thereof does not take place. The curing of the material by its nature takes place at room temperatures and of course can be accelerated if the temperature is increased. Temperatures in the range from 50 to 350° F. are usual. The mold is usually at atmospheric pressure because it is vented at the ends but the pressure developed by the liberated $CO_2$ gas from the mass determines its own reaction pressure. The process is preferably continuous and the time of passage through the mold cavity is determinative of the amount of cure which is imparted to the cellular reaction product. In the production of diisocyanate foam products having closed or non-communicating cells, the mold cavity is filled or nearly so, at the beginning of the process. The reaction is allowed to take place until a semi-cured condition is attained and thereafter the material is removed from the mold cavity and allowed to expand after removal. As in the production of articles having open or intercommunicating cells, the reaction takes place at atmospheric pressure and the temperature employed can either be room temperature or at elevated temperatures in the range above indicated. In the production of diisocyanate foam articles, either with open or closed cells, the material upon leaving the mold cavity may be subjected to a subsequent curing step at temperatures ranging from 50 to 350° F. It is a feature of the present invention that diisocyanate foams with very low shrinkage and high degree of cure can be effected by submerging the reaction product, after leaving the mold cavity, in boiling water at atmospheric pressure for 5 to 20 minutes and it is immaterial whether or not the boiling water comes into contact with the foam product.

The application of a protective skin coating to the final diisocyanate foam product is effected in accordance with the invention during the formation of the foam. The type of protective coating applied in the practice of the invention is generally of a rubbery material, which either by drying or by curing at elevated temperatures, is adapted to form an impervious continuous coating, resistant to light and atmospheric oxidation. It is to be understood, however, that other types of coatings may be applied as for example, decorative fabrics of all types and the terms protective coating or protective coating material as used herein are intended to include such other primarily decorative coatings. Because the protective skin coating is applied during the formation of the foamed articles, adhesive materials or cements are not necessary and the bonding of the skin coating to the cellular reaction product is of a chemical-type bond brought about by the polymerization of the reactants which form the final product. The rubbery material which is applied to the surface of the diisocyanate foamed products may be intially in the form of a latex dispersion either an aqueous or non-aqueous type; dispersed in a solvent or in solid sheet form. Examples of suitable rubbery materials for the application of a protective skin coating are neoprene; rubber, either synthetic or natural; rubber cements both natural and synthetic; rubber latex both natural and synthetic, e.g. neoprene latex; synthetic resins, either thermosetting or thermoplastic. A particularly desirable technique for the application of the protective skin coating and one which results in a strongly adherent skin coating is carried out by preheating the mold cavity to a sufficiently elevated temperature so that flash drying of the coating material takes place. By the use of a coating material with a high solids content and with a well-heated mold, multiple layers of the coating material can be rapidly applied to the mold surface to build up a coating having the desired thickness. Thereafter the cellular reaction mass is brought into contact with the prelaid layer of coating material while the latter is still tacky from the elevated temperature employed during its deposition and the reaction resulting in the foamed material is allowed to take place and controlled as to time to produce a product having the desired characteristics. Upon removal of the foamed material from the mold cavity, the previously deposited layer of coating material will be firmly bonded to the foamed product and have a cohesive strength with the surface of the foamed material greater than that of the body of the foamed material. Those coating materials which do not require elevated curing temperatures can be applied to the mold cavity without preheating of the latter and after a time has elapsed to enable the coating material to obtain the required body, the reaction mass consisting of an organic substance having a plurality of groups containing reactive hydrogen, a diisocyanate, a catalyst, an emulsifier and water can be introduced into the mold cavity and the reaction allowed to take place as previously indicated, depending upon whether the cell structure in the final product desired is that of a closed or open type. Excellent bonding between the foam product and the coating material has resulted from this technique.

The method of producing diisocyanate cellular reaction products according to the invention is preferably by a continuous process which effects substantial economies in operation and which is best described by reference to the accompanying drawings, wherein:

FIGURE 1 is a schematic view of apparatus illustrating the production of diisocyanate foam cellular reaction products on a continuous production basis;

FIGURES 2, 3, 4 and 5 are sectional views on the lines 2—2, 3—3, 4—4 and 5—5 respectively of FIGURE 1; and FIGURE 6 is a modified form of innerliner construction for use with the continuous process.

The continuous process as illustrated in FIGURE 1 employs an innerliner as at 7 in which the reacting materials are deposited and by which they are carried through the partial curing area where the final form to the foam article is imparted. The endless innerliner 7 is frictionally carried by an endless belt 8 which is driven in well-known manner from power supplied to one of a pair of pulley wheels 9 and before passing under the stations where the reaction mass is applied to the same, the endless innerliner 7 may if desired be passed through a tank 11 carrying mold release fluid 13. It should be apparent that the mold release tank 13 may be omitted in the practice of the invention. The shape of the innerliner after application of mold release fluid thereto is substantially that shown in FIGURE 2, which is the fully open condition. Upon leaving the mold release tank 11, the innerliner passes under a skin or protective coating-applying station, indicated generally at 15 where coating material is sprayed onto the open innerliner and thereafter the innerliner passes between spaced pairs of forming rolls 17 which partially close the innerliner, so that it assumes the shape substantially as in FIGURE 3. While the innerliner is partially opened, a pair of wire inserts as at 18, which will be embedded in the final foam product may be introduced into the innerliner cavity as part of the continuous process by a pair of feed wheels, one of which is shown as at 19. A plurality of readily deformable hooks 20 at each side of the innerliner 7 temporarily support the wire inserts 18. Thereafter the innerliner 7 passes beneath a station 21 where the reaction mass is deposited in the cavity formed by the partially opened innerliner. The reaction mass can be formed by the direct combination of an organic substance having a plurality of groups containing reactive hydrogen, a diisocyanate, a catalyst and water, or a prepolymer can be formed from the organic substance and a diisocyanate, before the addition of a catalyst and water, all as previously described. The innerliner 7 containing the reaction mass then passes beneath a closing roll 23 before entering the partial curing area, the extent of which is designated by the letter A. As the innerliner 7 passes through the area A, the shape thereof is rapidly fixed by a pair of guide forms 25, 26 (FIG. 4). The shape of the guide forms 25, 26 determines the shape of the final product and the length of the guide forms is determined by the proportion of ingredients used and the rate of travel of the endless innerliner 7. The filling of the innerliner cavity and the amount of set-up or cure allowed to take place for the reaction mass has been found to be determinative of the cell structure of the final product as previously described. From the time the innerliner travels from the protective coating or skin-applying station 15, to the station 21, the protective skin coating material has sufficiently dried to have substantial body so that the subsequent application thereto of the reaction mass does not disturb the initial protective coating applied to the innerliner. If necessary, means (not shown) may be employed to initially cure or polymerize the coating material to insure its retention as an integral body during the reaction of the foaming ingredients throughout the travel through the partial curing area A.

If desired, the guide forms 25, 26 may be heated to increase the reaction temperature and decrease the time of passage required through the partial curing area A. The degree of set-up or cure allowed to take place during the passage of the reaction mass through the area A will depend upon the type of cell structure desired in the final product and in any event, the degree of set-up is always controlled so that the cellular mass issuing from the area A has sufficient body to retain the final form imparted thereto by the guide forms 25, 26 through the innerliner 7. In the event closed cell structure is formed, subsequent expansion of the foamed material will take place after leaving the guide forms 25, 26. Substantially immediately following the exit of the innerliner 7 containing the partially cured cellular product from the area A, it passes under an opening roll 27 which opens the innerliner and allows the cellular product to leave the innerliner as at 29 where it is picked up by an endless conveyor generally designated 31. The final form of the product will correspond to the shape imparted to the innerliner 7 by the guide forms 25, 26 and in the arrangement being described will be substantially as shown in FIGURE 5. In some cases the curing of the foamed material may be completed before it leaves the area A and in other cases it may be desirable to subject the foam material to a final curing step. The final curing step may be accomplished by a curing oven indicated generally at 33, disposed above the cellular product as it is being conveyed onto the cutting table as at 35 where it is cut to length.

An additional skin applying station as at 37 may be employed subsequent to the final curing oven 33 when it is desired to touch up any non-uniformity in the previously applied protective skin coating. The innerliner has been shown as a one-piece material which can be of flexible metal, plastic or rubber impregnated webbing, or other suitable material, but it should be understood that a variety of innerliner constructions may be employed which varies with the type of weather-strip or other product desired. A material from which the cured foam itself and many protective skin coatings have been found to separate very easily without mold lubricant is polyethylene and the use of this material in extruded form as the innerliner is advantageous. A modified form of construction of innerliner is shown in FIGURE 6 which comprises a lower section 39 and an upper section 41, which are separately supplied by feed rolls and brought together by suitable guide forms (not shown) during travel of the same through the curing area A, following introduction of the reaction mass thereinto.

The following examples will illustrate the method and product of the invention in greater detail.

*Example 1*

A prepolymer was formed by reacting a polyester resin and a diisocyanate each in the proportions as follows:

Parts by wt.
Polyester resin (U–148, a product of Rohm & Haas) _____ 70
Diisocyanate (Hylene 80/20, a product of Du Pont)_ 30

The diisocyanate was added to the polyester resin at room temperature and the mixture was allowed to exotherm for 1 hour. The temperature of the mixture was then gradually raised to 180° F. over a period of 1 hour and maintained at this temperature for 1 hour thereafter and then cooled rapidly to 75° F. The prepolymer was then reacted with an emulsifier, a catalyst and water in the following proportions:

Parts by wt.
Prepolymer _____ 100
Emulsifier EL–719 (a product of Antara Products)_ 1.25
Catalyst (N-methyl morpholine)_____ 3
Water _____ 2

The reaction mass was immediately poured into an innerliner in a continuous apparatus of the type previously described. A neoprene latex film of the desired thickness, incorporating coloring dyes, had been previously sprayed into the cavity of the innerliner. The innerliner containing the reaction mass was then passed through a pair of guide forms of the general arrangement described and allowed to set-up until substantially complete cure was effected. The cellular product with the latex film firmly bonded thereto was separated from the innerliner and employed as a weatherstrip under artificial conditions simulative of conditions to which it would be subjected when in actual use. Excellent results were observed.

*Example 2*

A prepolymer was prepared as in the previous example employing a polyester resin and a diisocyanate in the following proportions:

Parts by wt.
Polyester resin (Price 3000, a product of Price Resin Co.) _____ 75
Diisocyanate (Hylene 65/35, a product of Du Pont)_ 25

The prepolymer was reacted with an emulsifier, a catalyst and water in the following proportions:

Parts by wt.
Prepolymer _____ 100
Emulsifier EL–719 (a product of Antara Products)_ 1
Catalyst diethylethanolamine_____ 3
Water _____ 1.5

The reaction mass was immediately poured into an innerliner carrying a thin solid sheet of a chloro-sulphonated polyethylene resin known as Hypalon (a product of Du Pont) and processed through the same apparatus as in the previous example except that the immersion step in the mold release tank was eliminated and the temperature of the reaction mass while passing through the guide forms was raised to 90° F. The resulting cellular product was a continuous strip having firmly adhered thereto the Hypalon sheet which could not be peeled off without destruction of the cellular structure. The cellular product was cut into suitable lengths and proved to be desirable for weather-stripping automotive vehicle doors.

*Example 3*

A polyester resin, a diisocyanate, a catalyst and water were simultaneously mixed in a mixing vessel in the following proportions:

Parts by wt.
Polyester resin (Price 3000, a product of Price Resin Co.)_____ 100
Diisocyanate (Hylene 80/20, a product of Du Pont) _____ 40
An emulsifier EL–719 (a product of Antara Products) _____ 1.5
Catalyst (N-methyl morpholine)_____ 1
Water _____ 3

Immediately upon mixing of the ingredients, the mixture was discharged into an innerliner the cavity of which had previously been coated with a film of Hypalon polymerized from a liquid in lieu of the solid sheet as in the previous example. The innerliner was then passed through a pair of guide forms at a rate sufficient to allow the reaction mass to proceed to nearly complete gel or set-up. The inner-liner with the cellular reaction product contained therein was then passed through a tank of boiling water at atmospheric pressure at a rate such that the cellular product remained immersed for approximately ten minutes to complete the final set-up. The continuous strip with the Hypalon film integrally united thereto was removed from the innerliner and exhibited very low shrinkage and a high degree of cure.

*Example 4*

The foam producing composition of Example 3 was introduced into an innerliner previously coated with neoprene latex as in the former example in such quantities that the mold cavity was only partially filled at the commencement of the process. The amount of the reaction mass was adjusted to that quantity which was previously determined would subsequently expand and entirely fill the mold cavity. The innerliner was then passed through a pair of guide forms and the temperature of the reaction mass was raised to approximately 90° F. while the material was still confined in the innerliner cavity. The material was maintained within the mold cavity while the reaction proceeded under the pressure developed by the liberated gas and by confinement of the material in the innerliner for a time sufficient to produce enough set-up or gel such that when the material was removed from the mold further expansion thereof did not take place. The result was a cellular foam product having a strongly adherent skin coating of latex film with a large percentage of open or communicating cells.

*Example 5*

A prepolymer was formed by reacting a polyalkylene ether glycol resin with a diisocyanate in the following proportions:

|  | Parts by weight |
|---|---|
| Polyalkylene ether glycol (Terracol 30, a product of Du Pont) | 40 |
| Diisocyanate (Hylene 80/20, a product of Du Pont) | 10 |

All of the glycol resin was added to a mixing reactor and the temperature was raised to 120° F. Half of the above amount of the diisocyanate was then added to the glycol resin and the temperature of the mixture was raised to 180° F. and maintained at this temperature for approximately two hours. The remainder of the diisocyanate was then added and the temperature was raised to 280° F. and held at this temperature for an additional period of approximately two hours. The mixture was then cooled rapidly to 120° F. to form the prepolymer.

The prepolymer was then reacted with a catalyst, silicone oil and water in the following proportions:

|  | Parts by weight |
|---|---|
| Prepolymer | 100.00 |
| Diisocyanate (Hylene TM, a product of Du Pont) | 12.50 |
| Silicone oil (DC-200, a product of Dow Corning) | 10.00 |
| Catalyst (N-methyl morpholine) | 1.25 |
| Water | 4.00 |

The reaction mass was immediately poured onto a sheet of woven upholstery fabric and confined in a mold cavity and allowed to react at room temperature until a complete cure was effected and a firm bond was attained between the cellular structure and the woven fabric. A resilient upholstery material was thus produced such as would be satisfactory for crash padding or decorative covering of various sections of the interior of automobile vehicles.

It will thus be seen that there has been provided by this invention a method and means in which the various objects hereinabove set forth, together with many thoroughly practical advantages are successful achieved. While the preferred embodiments of the invention have been clearly shown and described it is to be understood that the same is susceptible to modification, variation and change without departing from the spirit thereof or the appended claims.

What I claim is:

1. A continuous method of forming a flexible cellular reaction product in longitudinal strip form having uniformly distributed and firmly bonded over the surface thereof an integral protective skin coating comprising depositing a rubbery material in the cavity defined by an endless moving innerliner, drying said rubbery material so that it has sufficient body to remain undisturbed by the subsequent contact with a foam producing composition, thereafter depositing a foamable mixture of diisocyanate and an organic substance having a plurality of groups containing reactive hydrogen on said film and thereafter passing said innerliner through a pair of guide forms for a period of time sufficient to allow the reaction of said mixture to proceed to set-up such that the product has sufficient body so as not to rupture when removed from said cavity, and continuously withdrawing said innerliner from said guide forms and removing from the cavity of said innerliner continuously a strip of cellular product.

2. A continuous method of forming a flexible cellular reaction product in longitudinal strip form having uniformly distributed and firmly bonded over the surface thereof an integral protective skin coating comprising depositing a film of rubbery material in the cavity defined by an endless moving innerliner, drying said rubbery material so that it has sufficient body to remain undisturbed by the subsequent contact with a foam producing composition, thereafter depositing a mixture of a diisocyanate, an organic substance having a plurality of groups containing reactive hydrogen, a catalyst and water on said film and thereafter passing said innerliner through a pair of guide forms, heating said mixture to a temperature between 50° and 350° F. for a period of time sufficient to allow the reaction of said mixture to proceed to set-up such that the product has sufficient body so as not to rupture when removed from said cavity, continuously withdrawing said innerliner from said guide forms and removing from the cavity of said innerliner continuously a strip of cellular product with said film adhered over the surface thereof and thereafter completing the set-up by subjecting said strip to a temperature between 50° and 350° F.

3. A continuous method of forming a flexible cellular reaction product in longitudinal strip form having uniformly distributed and firmly bonded over the surface thereof an integral protective skin coating comprising depositing a film of rubbery material in the cavity defined by an endless moving innerliner, drying said rubbery material so that it has sufficient body to remain undisturbed by the subsequent contact with a foam producing composition, positioning longitudinally disposed reenforcing elements within said cavity, thereafter depositing a mixture of a diisocyanate, an organic substance having a plurality of groups containing reactive hydrogen, a catalyst and water on said film and thereafter passing said innerliner through a pair of guide forms, heating said mixture to a temperature between 50° and 350° F. for a period of time sufficient to allow the reaction of said mixture to proceed to set-up such that the product has sufficient body so as not to rupture when removed from said cavity, continuously withdrawing said innerliner from said guide forms and thereafter completing the set-up of the cellular strip by subjecting said strip to a temperature between 50° F. and 350° F.

(References on following page)

References Cited in the file of this patent

UNITED STATES PATENTS

| | | |
|---|---|---|
| 2,124,921 | Lederer | July 26, 1938 |
| 2,376,653 | Boyer | May 22, 1945 |
| 2,512,506 | Saint Denis | June 20, 1950 |
| 2,525,966 | Smith et al. | Oct. 17, 1950 |
| 2,586,275 | Toulmin | Feb. 19, 1952 |
| 2,600,143 | Vaughn | June 10, 1952 |
| 2,668,987 | Harris et al. | Feb. 16, 1954 |
| 2,744,340 | Gerber | May 8, 1956 |
| 2,744,847 | Orr | May 8, 1956 |
| 2,753,276 | Brochhagen et al. | July 3, 1956 |
| 2,753,642 | Sullivan | July 10, 1956 |
| 2,884,668 | Harris et al. | May 5, 1959 |

OTHER REFERENCES

Goggin et al.: Foamed Plastics, British Plastics, December 1947, pages 528–36.